United States Patent [19]

Whiteside et al.

[11] 3,973,243
[45] Aug. 3, 1976

[54] DIGITAL IMAGE PROCESSOR

[75] Inventors: Arliss Eugene Whiteside, Royal Oak; John Aubrey Hornbuckle, Brighton, both of Mich.

[73] Assignee: The Bendix Corporation, Southfield, Mich.

[22] Filed: Oct. 15, 1974

[21] Appl. No.: 514,872

[52] U.S. Cl. .............................................. 340/172.5
[51] Int. Cl.² ........................................ G06F 9/20
[58] Field of Search ................. 340/172.5, 146.3 Q; 235/181, 151; 343/5 CM, 5 MM, 100 CL; 250/566, 568; 356/2

[56] References Cited
UNITED STATES PATENTS

| | | | |
|---|---|---|---|
| 3,375,353 | 3/1968 | Rossoff et al. .................... | 235/151 |
| 3,554,645 | 1/1971 | Bertram ............................. | 356/2 |
| 3,597,083 | 8/1971 | Fraser ................................ | 356/2 |
| 3,706,071 | 12/1972 | Gray .............................. | 340/146.3 Q |
| 3,717,756 | 2/1973 | Stitt .................................... | 235/181 |
| 3,794,272 | 2/1974 | Hecker ............................ | 343/5 MM |

*Primary Examiner*—Raulfe B. Zache
*Attorney, Agent, or Firm*—James R. Ignatowski

[57] ABSTRACT

An address modifier for providing addresses for accessing data elements from a memory by addressing memory locations in a special order different from the order in which the data elements are stored in the memory. An address integrator is provided for each index required to identify one data element. Each address integrator includes a plurality of registers with each register connected by an adder to the next higher register and with the highest register connected to the memory. Each address integrator computes one position index identifying each data element and the addresses are provided sequentially in the special order for accessing the memory.

17 Claims, 5 Drawing Figures

DIGITAL IMAGE PROCESSOR

The invention relates to computers and more particularly to memory address computation. The invention is shown and described in connection with processing image data in sterophotogrammetry as described in Application Ser. Number 442,024 filed Feb. 13, 1974 now U.S. Pat. No. 3,901,595 and assigned to the same assignee as the present application.

In sterophotogrammetry, image data is recorded on two photographs. Conjugate image points on the photographs must be cross-correlated and must be accessible together in any desired order. General purpose digital computers of conventional design are used to process image data by storing the digital data elements, such as photograph densities, in random access memories. A simple one to one relationship is established between a memory position index comprising the address and the row and column numbers of an image point on a photograph within a predetermined grid in accordance with the following:

$$m = i + nj \qquad (1)$$

In which $m$ is the memory location number where the image density value at grid position row $j$, column $i$, is stored and $n$ is the number of columns in the grid.

To access image data elements from the memory in the order recorded along the grid, the computer is programmed to increment the memory address. However, the indexing capabilities of the computer are limited to sequencing the memory locations in strict sequential order and every memory location or every nth memory location must be accessed.

Accessing the memory in a special order for data elements corresponding to conjugate image points of two photographs is relatively slow because the computer must access the memory for data elements corresponding to an image point of one photograph and then the conjugate image point of the other photograph in sequential order. For each data element, the address in the memory must first be calculated in accordance with equation (1) above. This sequence needs to be repeated a substantial number of times in order to access all the data elements from the memory in the special order desired.

The present invention calculates memory addresses by address integration. The address is separated into one or more parts corresponding to the number of position indices or dimensions required for identifying the data element. For two position indices row $j$ and column $i$ referred to above in equation (1), high order bits (column) of the address are generated by one integrator and the low order bits (row) of the address are generated by a second integrator. The number of high order bits corresponds to the size of the array in one dimension and the number of low order bits corresponds to the size of the array in a second dimension. The bits of the address are obtained preferably from result registers of digital integrators or function generators.

The invention contemplates an address modifier for providing addresses for accessing data elements from a memory by addressing memory locations in a special order different from the order in which the data elements are stored in the memory and in which each data element is identified by at least one index, comprising an address integrator for each index required to identify one data element and each address integrator including means for computing one identifying index of each data element, and means for controlling each address integrator for providing addresses sequentially in the special order for accessing the memory. Each address integrator includes a plurality of registers with each register connected by an adder to the next higher register and with the highest register connected to the memory. The bottom-most register need not be a simple register but could be a digital function generator. Such a digital function generator may include a plurality of memory registers storing different values used at different times.

Address integration enables addressing the memory for data elements corresponding to image points on the photographs in a special order and saves sequential computations of the proper addresses for special accessing of image data. Address integration may be used in various ways in connection with a computer for accessing from memory data elements identified by one or more position indices. For example, in sterophotogrammetry, data elements accessed from memory may be photograph densities and address integration may be included in an image processing interface, a peripheral processor for cross correlation of image data, or a grid conversion interface with or without interpolation. Address integration also may be used in a special purpose processor for cross correlation of image data. In the above patent application, address integration may be used in the "parallax address modification".

DETAILED DESCRIPTION OF THE INVENTION

Figure 1:
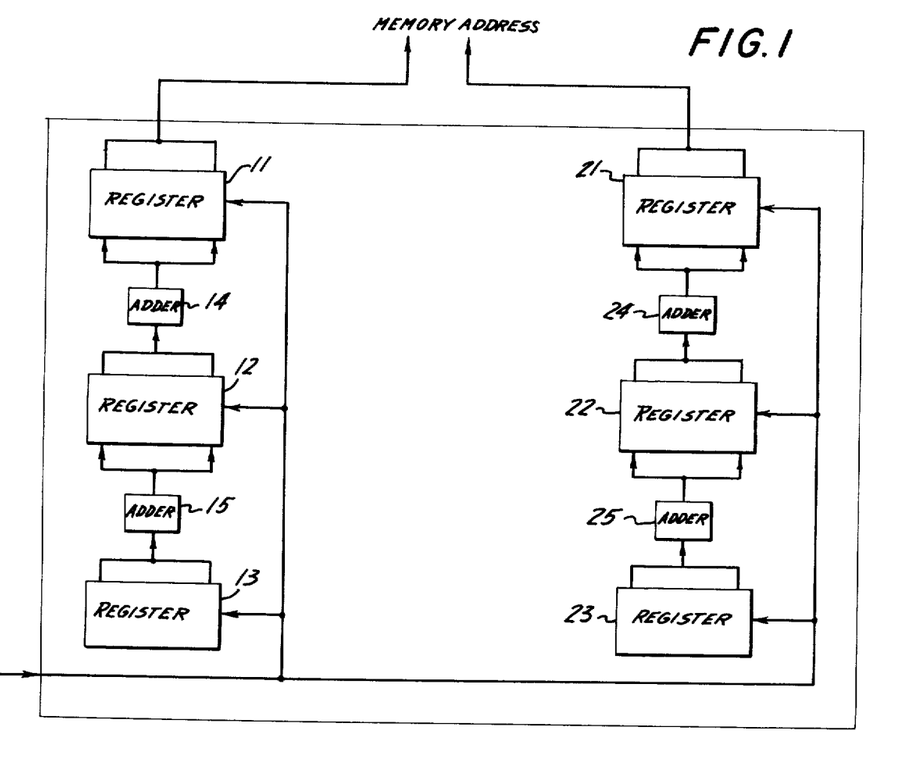
FIG. 1 is a block diagram illustrating the basic concept of two-dimensional address integration according to the invention.

Referring to FIG. 1, the memory address generated using two dimensional address integration according to the invention uses data from the top parts of two registers 11 and 21. Registers 11 and 21 have associated registers 12 and 22, respectively, whose contents are added by adders 14 and 24 to the contents of registers 11 and 21 to obtain the next memory address. Similarly, registers 12 and 22 have associated registers 13 and 23, respectively, whose contents are added by adders 15 and 25 to the contents of registers 12 and 22 each time a new memory address is obtained. This concept can be repeated indefinitely if desired, by providing additional registers and adders, not shown, to add to the contents of the last two registers.

The function of each adder is to add the contents of the input register to the contents of the output register. This may be mathematically stated as:

$$A_n = A_{n-1} + B_{n-1}$$

where:

$A_n$ = contents of the result register after $n$ addition steps (or at time $n$)

$A_{n-1}$ = contents of the result register after $n-1$ addition steps (or at time $n-1$)

$B_{n-1}$ = contents of the input register after $n-1$ addition steps (or at time $n-1$)

Such adders are available as standard integrated circuit components, such as the 4-bit Texas Instruments SN5483, which is cascadable for any desired number of bits. The initial contents of all registers are loaded by external means, either by computer instructions to output data or by other means. The registers can be of any length and need not be the same length and not all bits of the registers need be used in each addition. In some instances, some high order bits of the higher registers may not be added into from the next lower register, except for carries from the low order bits, and some low order bits of the lower register may not be added into the next higher register depending on the circumstances.

The top two pairs of registers 11, 12, 21 and 22 operate like a pair of integrators as used in a digital differential analyzer. The memory address can be computed using a collection of digital differential analyzer integrators and other incremental computation elements to generate the desired address parts as functions of time. The computation elements may include, or consist of, digital function generators. In particular, registers 12 and 22 or 13 and 23 may be replaced by digital function generators which include a plurality of memory registers storing different values to be added at different times to the next-higher registers.

Assuming that the registers 11, 12, 13, 21, 22 and 23 are all the same length and the contents of each register is entirely added to the next higher register, then the contents of all registers can be readily computed as follows:

$$C_n = C_o \quad (2)$$

$$B_n = B_o + C_o n \quad (3)$$

$$A_n = A_o + B_o n + C_o \frac{n(n-1)}{2} \quad (4)$$

where $A_n$, $B_n$, $C_n$ = contents of registers 11, 12, and 13 (or registers 21, 22, and 23), respectively, after $n$ addition steps $A_o$, $B_o$, $C_o$ = initial contents of registers 11, 12 and 13 (or registers 21, 22, and 23), respectively, before the first addition step $n$ = number of addition steps performed Non-zero initial values for $B_o$ and zero initial values of $C_o$ for both address parts causes sequencing through image data elements approximately lying on a straight line which is skewed with respect to the image data grid. A non-zero initial value for $C_o$ for either address part, and a non-zero initial value for $B_o$ for both address parts causes sequencing through image data elements lying approximately on a curved line with respect to the image data grid. Different non-zero initial values for $C_o$ for both address parts causes sequencing through image data elements lying on a curved line with respect to the image data grid. The same non-zero initial value for $C_o$ for both address parts causes sequencing through image data elements lying approximately on a straight line, but the rate of sequencing along the line varies.

Two dimensional address integration shown in FIG. 1 will access the closest original grid points to points along one line of the desired output grid. This requires the use of the proper initial values for the address integration registers. The relationship between the original two-dimensional position coordinates and the desired line position is as follows:

$$x = A_x + B_x Z + C_x Z^2 \quad (5)$$

$$y = A_y + B_y Z + C_y Z^2 \quad (6)$$

where $x, y$ = original two-dimensional position coordinates $Z$ = desired position along line of output grid $A_x$, $B_x$, $C_x$, $A_y$, $B_y$, $C_y$ = arbitrary constants. (These constants are directly related to the $A_o$, $B_o$, and $C_o$ initial values of the address integration registers in equations 2 to 4).

If the points $x, y$ are equally spaced along the line $Z$ then:

$$Z = Z_o + nD$$

Where:

$n$ has the integer values from 0 to N $Z_o$, $D$, $N$ = arbitrary constants.

Substituting this value of $Z$ in equations 5 and 6 gives:

$$x = A_x + B_x (Z_o + nD) + C_x (Z_o + nD)^2$$

$$y = A_y + B_y (Z_o + nD) + C_y (Z_o + nD)^2$$

The values of $A_o$, $B_o$ and $C_o$ in equation 4 are found by equating $A_n$ to $x$ and finding the values for $A_o$, $B_o$ and $C_o$ which permit the equality to hold for all values of $n$ as follows:

$$A_o + B_o n + C_o \frac{n(n-1)}{2} =$$
$$A_x + B_x(Z_o + nD) + C_x(Z_o + nD)^2$$

Figure 2:
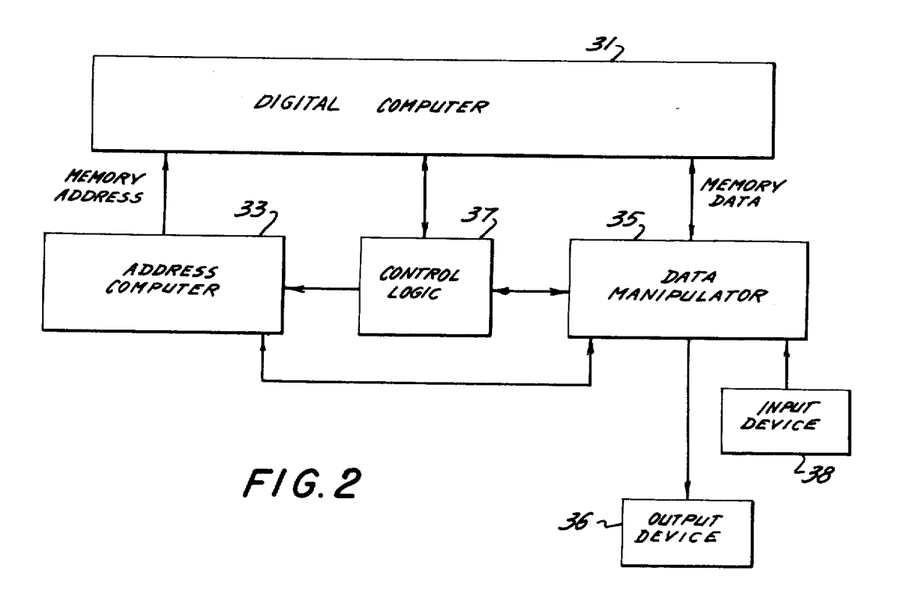
FIG. 2 is a block diagram showing address integration used with a computer in an image processing interface.

FIG. 2 shows an image processing interface for accessing image data elements from the memory of a digital computer 31 for block transfer of image data elements between the computer and an input or output device 36, 38 where the interface performs image data manipulations upon the data as it is transferred. If the desired order for transfer of image data elements to an input or output device does not follow the grid in which data is stored, address integration can be used in the interface. An interface with image processing capabilities saves computer time and memory in comparison to current techniques which require the computer to calculate and store data in the desired output form.

The memory address is computed by the address computer 33 implemented as in FIG. 1 and the memory address is supplied to the direct memory access facilities of the digital computer for accessing the computer memory. The data elements obtained from the computer are manipulated as desired by data manipulator 35 under the control of control logic 37 before being sent to an output device 36. Input data from an input device 38 is manipulated as desired by the data manipulator 35 and sent to the computer memory. The memory address is computed simultaneously or sequentially and supplied to the computer. The interface then accesses the memory of the computer to obtain the data elements. Control logic 37 controls the sequential handling of a plurality of data elements and controls computation of the address for each data element and all needed input or output functions of each data element by performing required operations directly or by using a stored program tailored to the particular types of processing operations required. However, control logic 37 may be controlled and monitored to some degree under program control by computer 31 to provide the control indicated above. In some instances it may be desirable to transfer information from address computer 33 to data manipulator 35 and/or from the data manipulator to the address computer or to control logic 37 to control or be used in the address computation.

Control logic 37 provides the control timing and clock signals required by the various other circuit elements. Details of this control logic vary with the specific application and with the specific implementation chosen for the other circuit elements. The control logic can be designed by well known techniques, such as discussed in "The Design of Digital Systems" by John B. Peatman, McGraw Hill, 1972.

Figure 3:
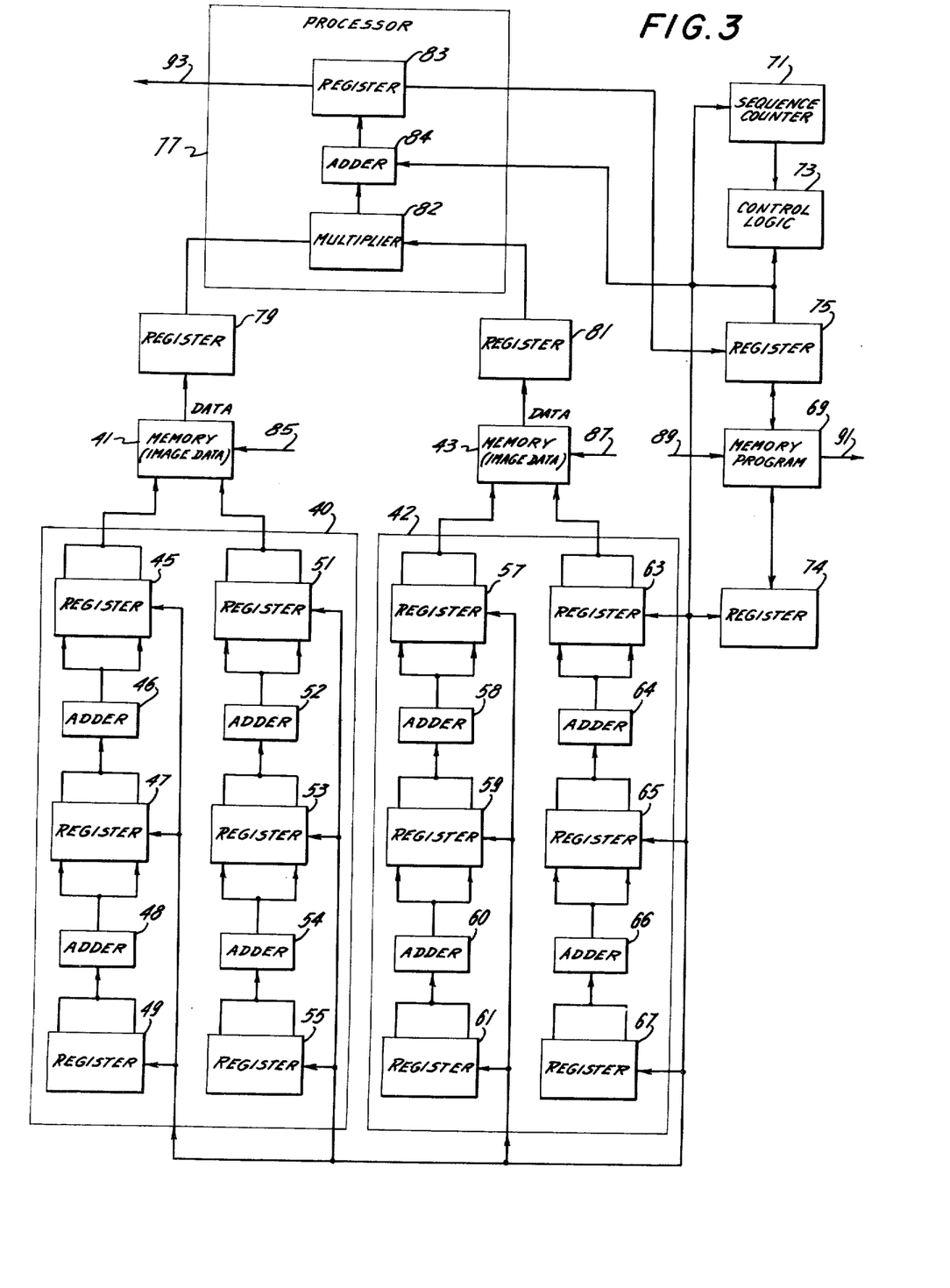
FIG. 3 is a block diagram showing a special purpose processor for cross correlation of image data using address integration according to the invention.

FIG. 3 shows a special purpose processor 77 for cross correlation of image data elements from two photographs by multiplying corresponding image data elements and accumulating the products as shown and described in U.S. Pat. No. 3,717,756. Two address computers 40 and 42 constructed according to the invention each using two-dimensional address integration as in FIG. 1 access from memories 41 and 43 corresponding data elements of two images in an order which does not follow the grid. Address computer 40 includes registers 45, 47 and 49 connected by adders 46 and 48 and arranged in parallel with registers 51, 53 and 55 connected by adders 52 and 54. Address computer 42 includes registers 57, 59 and 61 connected by adders 58 and 60 arranged in parallel with registers 63, 65 and 67 connected by adders 64 and 66. Two separate data memories 41, 43 are used to store data elements (photograph densities) of two images. Address computer 40 provides addresses to memory 41 for accessing image data elements relating to one photograph. Address computer 42 provides addresses to memory 43 for accessing image data elements relating to a second photograph.

A memory 69 provides program data. Before starting an operation, program data $A_o$, $B_o$, $C_o$ (equations 2 to 4) from memory 69 is loaded by a register 75 into the registers of address computers 40 and 42 for accessing memories 41 and 43, respectively Program data from memory 69 is loaded into a sequence counter 71 which determines the number of times the operation is to be repeated. Program data from memory 69 also is applied by register 75 to control logic 73 to provide the control, timing and clock signals for specifying the operation to be performed. Also program data from memory 69 can be applied to program memory address register 74 to control the sequence of memory access and program execution. Memory 69 may also provide data to the processor 77 through register 75 for manipulation, and data from the processor may go into register 75 for storage in memory 69.

Memories 41 and 43 are connected to registers 79 and 81, respectively, which in turn are connected to processor 77. The outputs of registers 79 and 81 are multiplied by a multiplier 82 and the product is added by an adder 84 in processor 77 to the sums stored in a register 83 in the processor. Inputs 85 and 87 are provided for entering digitized image data elements into memories 41 and 43, respectively. Also, an input 89 is provided for applying program data to memory 69 and an output 91 from memory 69 or an output 93 from processor 77 provides the computed results to an output device 95 or 97 respectively. The function of program memory 69 is to store digital words, as in the program memory of most digital computers. Such memories are available as standard integrated circuit components, such as the 1 by 1024 bit Texas Instruments TMS 1103, which can be used in arrays to produce any size memory. The output device may be an image printer or a recorder which requires data on a grid different from that in the computer memory either directly, or after processing.

Figure 4:
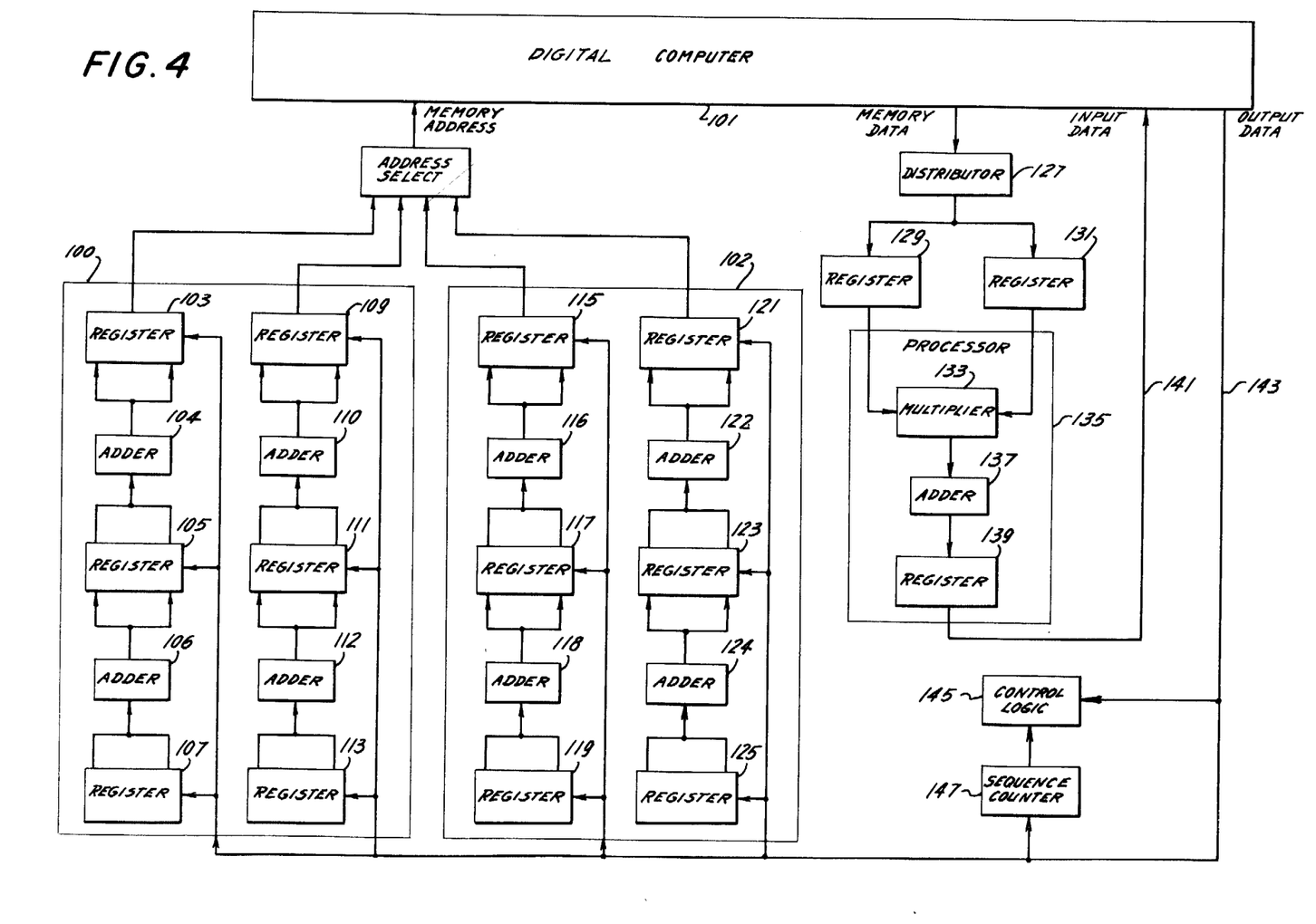
FIG. 4 is a block diagram showing a peripheral processor for cross correlation of image data using address integration in connection with a computer.

FIG. 4 shows a special purpose processor 135 which operates as a peripheral to a digital computer 101. The peripheral processor is similar to the special purpose processor 77 shown in FIG. 3 except that the peripheral processor uses the computer memory. The peripheral processor of FIG. 4 performs the same function as the peripheral processor of FIG. 3, that is, it reads from memory corresponding data elements from two images for processing together where both data elements are accessed in an order which does not follow the grid. The processing comprises multiplication of the products for cross correlation of the two images. The memory address is supplied to the digital computer 101 by the address computers 100 and 102 and the memory data is updated and supplied by the computer using the direct memory access facilities of the computer.

In FIG. 4 address computer 100 implemented as in FIG. 1 provides addresses to digital computer 101 for accessing image data elements relating to one photograph. Address computer 100 includes registers 103, 105 and 107 connected by adders 104 and 106 and arranged in parallel with registers 109, 111 and 113 connected by adders 110 and 112. Similarly, address computer 102 implemented as in FIG. 1 provides addresses for addressing the computer memory for accessing image data elements relating to a second photograph. Address computer 102 includes registers 115, 117 and 119 connected by adders 116 and 118 and arranged in parallel with registers 121, 123 and 125 connected by adders 122 and 124. If digital computer 101 has only a single memory then a set of corresponding image data elements are obtained sequentially; whereas, if the computer has two separate memories each having direct memory access, then the address from address computer 100 may be used to access one memory and the address from address computer 102 may be used to access the other memory and a set of corresponding image data elements can be obtained simultaneously.

The image data elements from the memory of digital computer 101 relating to the two photographs are distributed by distributor 127 to registers 129 and 131. Distributor 127 is a set of gates for routing information from a single source to different destinations at different times. This is also called a demultiplexor. Such demultiplexors are available as standard integrated circuit components, such as the dual 1-of-4-line Texas Instruments SN-54155, which can be used in arrays to demultiplex any size words. Data from the registers is multiplied by a multiplier 133 and the products are summed by an adder 137 for cross correlation and temporarily stored in a register 139 in peripheral processor 135 similarly to processor 77 in FIG. 3. The correlated data results then are supplied to the computer 101 through an input data channel 141. Distributor 127, registers 129, 131 and processor 13 correspond to data manipulator 35 in FIG. 2.

Output data channel 143 from digital computer 101 is connected to a control logic circuit 145, a sequence counter 147, and to the address computers 100 and 102. Computer 101 is programmed to control processor 135 through the output data channel 143. Data from computer 101 loads the registers of address computers 100 and 102 with the image data address information $A_o$ $B_o$ $C_o$ (equations 2 to 4) before starting an operation and loads sequence counter 147 which determines the number of times the operation is to be repeated. Computer 101 also controls the control logic 145 by initiating performance and specifying what operation is to be performed. Data from register 139 of processor 135 goes to the computer for further manipulation and/or output. Control logic 145 signals the computer when all data elements have been processed by means of either a status signal change or a program interrupt (not shown).

Instead of performing an operation a predetermined number of times specified by the initial contents of sequence counter 147, control logic 145 can terminate processing when a "boundary address" is reached. This may be done in addition to or instead of counting down the sequence counter, whichever comes first. One or more "boundary addresses" may be loaded from the computer 101 into special address calculation registers prior to initiating peripheral processor operation and sequencing stops when the address equals or exceeds the corresponding "boundary address".

The processor 135 shown in FIG. 4 is relatively simple and with additional arithmetic units the processor can perform more functions than shown in FIG. 4. For example, the processor 135 could compute not only the $\Sigma$ $ab$, but also the $\Sigma$ $b$, the $\Sigma$ $a^2$ and $\Sigma$ $b^2$, where $a$ and $b$ are the two corresponding quantities obtained from memory. Data from all processing result registers then could be supplied sequentially to computer 101 for further processing. The special processor could also perform the functions of the grid conversion interface shown in FIG. 3 and described above by providing a path from register 139 directly to an output device (not shown) and by suitably modifying control logic.

Figure 5:
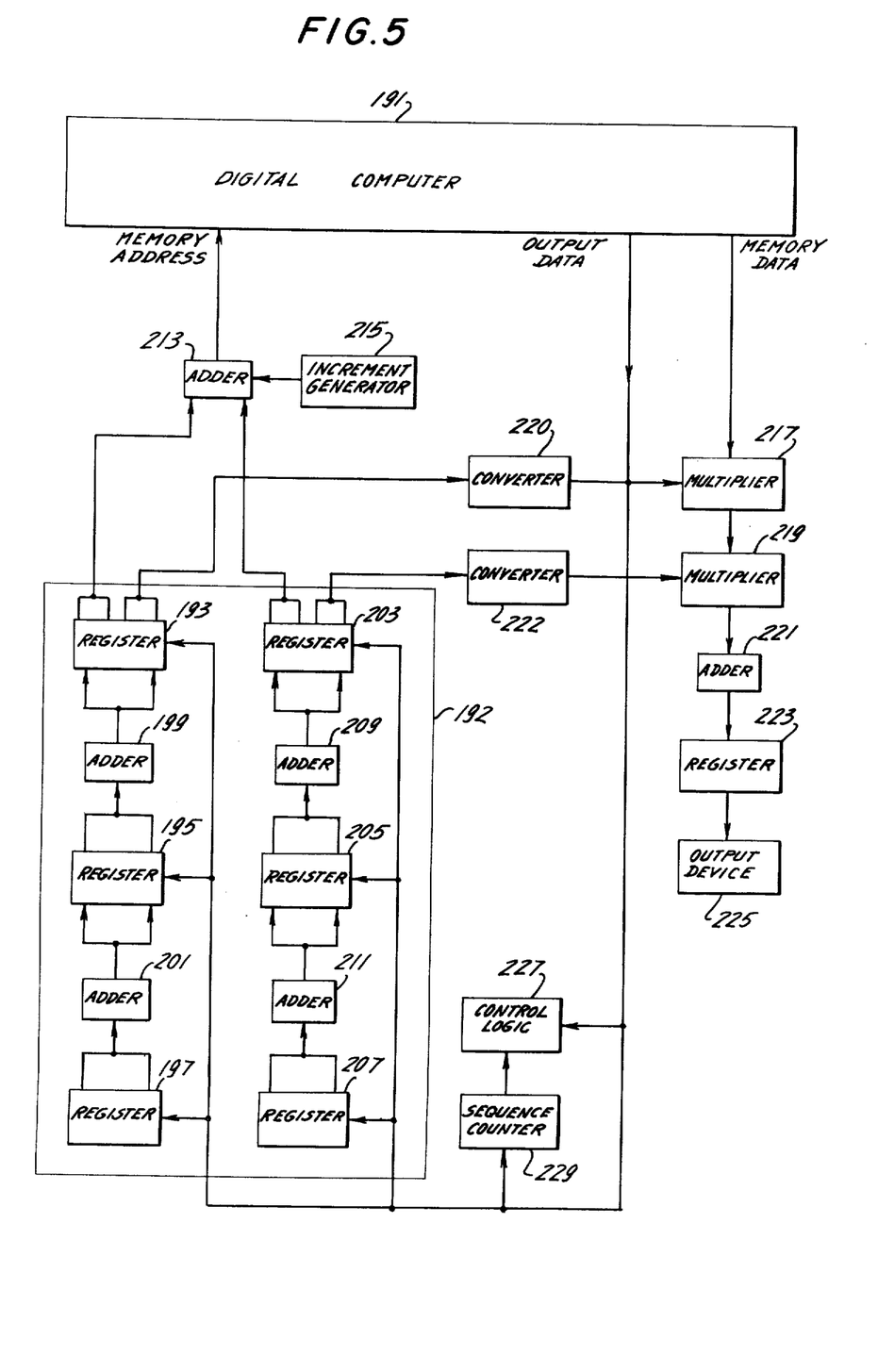
FIG. 5 is a block diagram showing a grid conversion interface with interpolation constructed according to the invention for use with a computer.

A grid conversion interface which interpolates the image value at each point is shown in FIG. 5. The original grid elements surrounding the desired output grid element are obtained sequentially from the memory of a digital computer 191.

The memory address using two-dimensional address integration is supplied by address computer 192 having registers 193, 195 and 197 connected by adders 199 and 201 and arranged in parallel with registers 203, 205 and 207 connected by adders 209 and 211. The memory address from address computer 192 is applied to an adder 213 where different increments from an increment generator 215 are added thereto to access the surrounding grid points from the computer memory. As each surrounding grid point value is obtained from the computer memory it is multiplied by multipliers 217 and 219 by the proper interpolation factors obtained from the less significant parts of the two registers 193 and 203 after conversion by converters 220 and 222, respectively. The products are summed in an adder 221 and are temporarily stored in a register 223 and the sums are then sent to an output device 225. Multipliers 217, 219, adder 221, register 223 and converters 220, 222 also correspond to data manipulator 35 in FIG. 2. The function of each multiplier is algebraic multiplication of the contents of the associated two input registers. Such multipliers are available as standard integrated circuit components, such as the 2 bit by 4 bit Advanced Micro Devices, Inc. AM2505, which can be combined to produce any desired number of bits. The converters 220 and 222 determine proper interpolation weights as described hereinafter. These weights involve arithmetic operations such as multiplication, subtraction, and selection upon the least significant parts of registers 193 and 203. Such arithmetic operations can be performed by combining multiplexors with adders and multipliers.

Computer 191 also controls control logic 227 by initiating performance and specifying what operation is to be performed and loads a sequence counter 229 which determines the number of times the operation is to be repeated.

The ratios of $x/b$ and $y/d$ referred to above are computed where:

$x, y$ = position of desired output grid point in the original two-dimensional position coordinates, $b, d$ = spacing of original grid points in $x$ and $y$ directions, respectively, in the original position coordinates.

The four grid points surrounding the desired output grid point, and the proper weighting factors for bilinear interpolating between these points are:

| Grid Point Column Number | Row Number | Interpolation Weight |
|---|---|---|
| INTEGER (x/b) | INTEGER (y/d) | [1−FRACTION (x/b)][1−FRACTION (y/d)] |
| INTEGER (x/b) | 1 + INTEGER (y/d) | [1−FRACTION (x/b)][FRACTION (y/d)] |
| 1 + INTEGER (x/b) | INTEGER (y/d) | [FRACTION (x/b)] [1−FRACTION (y/d)] |
| 1 + INTEGER (x/b) | 1 + INTEGER (y/d) | [FRACTION (x/b)] [FRACTION (y/d)] |

INTEGER $(x/b)$ = Integer part of the quotient of $x$ divided by $b$

FRACTION $(x/b)$ = Fraction part of the quotient of $x$ divided by $b$

The sum of the products of the interpolation weights times the values of corresponding grid points gives the proper interpolated value.

In implementing this arrangement, registers 193 and 203 compute $x/b$ and $y/d$ so that the integer part of each quotient appears in the part of the register which is used for the memory address and the fractional part of the quotient appears in the remainder of the register. The address registers are initially loaded from the computer memory with the proper quotients for the initial point. The next pair of registers is initially loaded with the components of the output point spacing, each component being in original grid point spacing. Similarly, the next pair of registers is initially loaded with the output point spacing differences from one interval to the next divided by the grid point spacing.

Control logic 73 in FIG. 3, 145 in FIG. 4 and 227 in FIG. 5 are similar to control logic 37 in FIG. 2 and may be designed by well known techniques as discussed in "The Design of Digital Systems" by John Peatman, McGraw Hill, 1972, referred to above. Likewise, multipliers 82 in FIG. 3 and 133 in FIG. 4 are similar to multipliers 217 and 219 in FIG. 5 and are available as standard circuit components, such as the two bit by four bit Advanced Micro Devices, Inc. AM2505 referred to above which can be combined to produce any desired number of bits.

While the invention has been described using two-dimensional address integration in connection with stereophotogrammetry, it should be understood that address integration can be used wherever one or more position indices are required to identify data elements and the memories must be accessed in sequences which do not follow the order in which the data elements are stored by using a group of registers for each position index with the groups connected in parallel.

What is claimed is:

1. An address modifier for providing addresses for accessing data elements from a memory by addressing memory locations in a special order different from the order in which the data elements are stored in the memory and in which each data element is identified by at least one index, comprising an address integrator for each index required to identify one data element and each address integrator including means for computing one identifying index of each data element, means for initially loading the address integrators with address information, and means connected to the address integrators and providing signals for controlling the address integrators for providing addresses sequentially in the special order for accessing the memory.

2. An address modifier as described in claim 1 in which each address integrator includes a plurality of registers with each register connected by an adder to the next higher register and with the highest register connected to the memory.

3. An address modifier as described in claim 2 in which the lowest register in each address integrator is a function generator for providing information for addition to the next higher register.

4. An address modifier as described in claim 2 in which each address integrator includes three registers and the contents of the registers of each address integrator after $n$ addition steps are:

$$C_n = C_o$$

$$B_n = B_o + C_o n$$

$$A_n = A_o + B_o n + C_o \frac{n(n-1)}{2}$$

where $A_n, B_n, C_n$ = contents of registers after $n$ addition steps, and $A_o, B_o, C_o$ = initial contents of the registers before the first addition, $n$ = number of addition steps performed.

5. An address modifier as described in claim 2 in which the means for controlling the address integrators is connected to a programmed digital computer and is responsive to the information therefrom.

6. An address modifier as described in claim 5 in which the means for initially loading the address integrators with address information is a programmed digital computer and the address integrators are connected to the computer and are initially loaded with address information therefrom.

7. An address modifier as described in claim 6 which includes a processor connected to the memory for processing data elements therefrom.

8. An address modifier as described in claim 5 having means for interpolating between the data elements from the memory including an increment generator for providing incremental indices, and an adder connected to the address integrators and to the increment generator and summing related indices with the incremental indices for the address.

9. An address modifier as described in claim 1 in which each data element is identified by at least two indices, and each address integrator computes one of the indices, and the means for controlling the address integrators provides signals to the address integrators to produce corresponding indices for each address simultaneously.

10. An address modifier as described in claim 1 in which the means for controlling the address integrators is connected to a programmed digital computer and is responsive to information therefrom.

11. An address modifier as described in claim 1 in which the means for initially loading the address integrators with address information is a programmed digital computer and the address integrators are connected to the computer and are initially loaded with address information therefrom.

12. An address modifier as described in claim 1 which includes a processor connected to the memory for processing data elements therefrom.

13. An address modifier as described in claim 1 having means for interpolating between the data elements from the memory including an increment generator for providing incremental indices, and an adder connected to the address integrators and to the increment generator and summing related indices with the incremental indices for the address.

14. An address modifier as described in claim 13 having multiplying means connected to the memory and to the address integrators and multiplying each data element from the memory by interpolation factors, and an adder connected to the multiplying means for summing the products and providing an interpolated output for controlling an output device.

15. An address modifier as described in claim 1 for cross correlation of image data, having control means connected to the address integrators for controlling the address integrators to provide addresses for related data elements in a set for accessing the related data elements from the computer memory.

16. An address modifier as described in claim 15 having a processor connected to the memory and including a multiplier for multiplying related data elements accessed from the memory and an adder for summing the products.

17. An address modifier as described in claim 16 which includes means connecting the peripheral processor to the memory for applying the sums to the memory in a predetermined order.

* * * * *

UNITED STATES PATENT OFFICE
CERTIFICATE OF CORRECTION

Patent No. 3,973,243  Dated  August 3, 1976

Inventor(s)  Arliss E. Whiteside and John A. Hornbuckle

It is certified that error appears in the above-identified patent and that said Letters Patent are hereby corrected as shown below:

Col. 4, line 20, delete "b" and insert therefor ---B---.

Col. 5, line 53, after "respectively" insert therefor ---,---.

Col. 7, line 6, delete "13" and insert therefor ---135---.

Col. 9, line 65, delete ",".

Col. 9, line 65 after "addition" insert therefor ---step.---

Signed and Sealed this

Fourteenth Day of December 1976

[SEAL]

Attest:

RUTH C. MASON
Attesting Officer

C. MARSHALL DANN
Commissioner of Patents and Trademarks